United States Patent
Maxwell et al.

(10) Patent No.: US 9,063,655 B2
(45) Date of Patent: Jun. 23, 2015

(54) MULTI-LEVEL PORT EXPANSION FOR PORT MULTIPLIERS

(75) Inventors: Conrad Maxwell, Sunnyvale, CA (US); Kyutaeg Oh, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 12/778,882

(22) Filed: May 12, 2010

(65) Prior Publication Data

US 2011/0283025 A1    Nov. 17, 2011

(51) Int. Cl.
G06F 3/00 (2006.01)
G06F 13/00 (2006.01)
G06F 3/06 (2006.01)

(52) U.S. Cl.
CPC ........... G06F 3/0607 (2013.01); G06F 3/0632 (2013.01); G06F 3/0683 (2013.01)

(58) Field of Classification Search
CPC .......... G06F 15/17; G06F 15/79; G06F 21/85
USPC .......................................... 710/1–16, 45, 100
See application file for complete search history.

(56) References Cited

U.S. PATENT DOCUMENTS

| | | | |
|---|---|---|---|
| 7,571,269 B2 * | 8/2009 | Schmidt et al. | 710/105 |
| 7,584,319 B1 * | 9/2009 | Liao et al. | 710/317 |
| 7,636,804 B2 * | 12/2009 | Bolt et al. | 710/68 |
| 7,643,410 B2 * | 1/2010 | Chang et al. | 370/229 |
| 7,689,736 B2 * | 3/2010 | Kalwitz | 710/31 |
| 7,783,802 B1 * | 8/2010 | Nemazie et al. | 710/74 |
| 7,904,566 B2 * | 3/2011 | Maxwell | 709/227 |
| 7,917,665 B1 * | 3/2011 | Booth et al. | 710/15 |
| 7,970,953 B2 * | 6/2011 | Chang et al. | 710/2 |
| 8,005,999 B1 * | 8/2011 | Felton et al. | 710/16 |
| 8,280,982 B2 * | 10/2012 | La Joie et al. | 709/219 |
| 8,326,939 B2 * | 12/2012 | Ueno et al. | 709/213 |
| 8,332,563 B2 * | 12/2012 | Sobelman | 710/305 |
| 2004/0243745 A1 * | 12/2004 | Bolt et al. | 710/68 |
| 2005/0147117 A1 * | 7/2005 | Pettey et al. | 370/463 |
| 2007/0005838 A1 * | 1/2007 | Chang et al. | 710/62 |
| 2007/0130373 A1 * | 6/2007 | Kalwitz | 710/8 |
| 2007/0156942 A1 * | 7/2007 | Gough | 710/302 |

(Continued)

FOREIGN PATENT DOCUMENTS

JP    2009-508192 A    2/2009

OTHER PUBLICATIONS

"Velocity User's Guide," CMS Products, Inc., (2006), 24 pages.

(Continued)

Primary Examiner — Idriss N Alrobaye
Assistant Examiner — Getente A Yimer
(74) Attorney, Agent, or Firm — Fenwick & West, LLP

(57) ABSTRACT

A port multiplier dynamically determines and reports its identity based on a number of supported downstream port connections. The number of supported downstream port connections can dynamically change. The port multiplier identifies devices connected to its downstream ports, whether storage devices or other port multipliers. Based on a total number of downstream ports, the port multiplier reports its identity upstream. The upstream reporting can be to another port multiplier, or the host device if directly connected to the host device. The port multiplier receives storage address space allocation from upstream based on its reported identity, and allocates the storage address space to its downstream ports.

14 Claims, 4 Drawing Sheets

(56) References Cited

U.S. PATENT DOCUMENTS

| | | | |
|---|---|---|---|
| 2007/0237174 A1* | 10/2007 | Chang et al. | 370/467 |
| 2007/0294582 A1* | 12/2007 | Rangarajan et al. | 714/36 |
| 2008/0155145 A1* | 6/2008 | Stenfort | 710/100 |
| 2008/0195581 A1* | 8/2008 | Ashmore et al. | 707/3 |
| 2008/0222354 A1* | 9/2008 | Wang | 711/114 |
| 2009/0007155 A1* | 1/2009 | Jones et al. | 719/327 |
| 2009/0106472 A1* | 4/2009 | Ji et al. | 710/305 |
| 2009/0234985 A1* | 9/2009 | Maxwell | 710/33 |
| 2009/0234994 A1* | 9/2009 | Oh et al. | 710/74 |

OTHER PUBLICATIONS

Mason, Harry, "Serial Attached SCSI (SAS)", 8 pages.

Mason, Harry, "Serial Attached SCSI Establishes its Position in the Enterprise", 10 pages.

International Search Report and Written Opinion from PCT/US2011/034195 mailed Dec. 22, 2011, 9 pages.

Written Opinion from European Application No. 11781011.9 mailed Dec. 12, 2012, 2 pages.

International Preliminary Report on Patentability and Written Opinion from PCT/US2011/034195 mailed Nov. 22, 2012, 6 pages.

European Extended Search Report, European Application No. 11781011.9, May 16, 2014, 7 pages.

Japanese Office Action, Japanese Application No. 2013-510123, Nov. 25, 2014, 3 pages (with English summary).

Chinese First Office Action, Chinese Application No. 201180023429.7, Jan. 4, 2015, 17 pages.

* cited by examiner

MULTI-LEVEL PORT EXPANSION FOR PORT MULTIPLIERS

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2010, Silicon Image, Inc., All Rights Reserved.

FIELD

Embodiments of the invention are generally related to port multiplication, and more particularly to port multiplication via multiple expansion levels.

BACKGROUND

Port multipliers allow many storage devices to connect to a single port of a host device. One port of a host device may be expanded to support a maximum of 15 connections, according to the SATA (Serial Advanced Technology Attachment) standard. Reference to the SATA standard may refer to the SATA Revision 3.0 specification, published May 29, 2009, and predecessors or derivatives thereof. According to the SATA Port Multiplier Specification, only a single level of expansion is allowed, and port multipliers cannot be connected to higher-level port multipliers. Thus, it is not possible to implement a general hub-style system with port multipliers according to the standard by deploying lower-level devices. Thus, all port multiplier expansion is assumed to occur through a single port multiplier device on a single level of expansion, without the possibility of expansion once the root port(s) are occupied.

Additionally, traditional port multipliers have a fixed identity, and are allocated a fixed amount of device ports, which fixes the amount of storage space based on their identity (as stated before no expansion is possible). For example, traditionally a 1 to 3 port multiplier is always a 1 to 3 port expander, and will always occupy no more and no fewer than 3 ports of the host device when connected. And the host port which has the 1:3 device would then be stopped from any additional expansion.

Although the SATA Port Multiplier Specification allows up to 15 connections, various practical constraints prevent utilizing more than a fraction of the available expansion connections. The cost of manufacturing of port multiplier devices increases as more ports are included. Perhaps more significantly is the performance cost, given that a single port multiplier will still have only the same amount of bandwidth (e.g., 3 Gbit/s or 6 Gbit/s) to connect to the host. Thus, practical constraints generally keep port expansion limited to port multipliers that have either 1 to 2, 1 to 4, 1 to 5, or 1 to 8 devices. As a result, a host device may be able to support more storage than can be achieved in a practical implementation.

SUMMARY

Embodiments of the invention are generally related to port multiplication, and more particularly to port multiplication via multiple expansion levels.

In one embodiment, a method in a system that supports SATA port multiplication includes dynamically identifying downstream ports of a port multiplier device and determining, based on the identifying, a number of downstream port connections supported by the port multiplier device. The method further includes port multiplier device reporting its identity to a device connected to an upstream port of the port multiplier device, the identity based on the determined number of downstream port connections supported by the port multiplier device, where each port connection enables a downstream connection to a storage device. The method further includes receiving dynamic allocation of storage address space based on the reported identity, the storage address space to be allocated among the downstream port connections supported by the port multiplier device (up to a maximum number of device ports specified by the governing standard, such as 15 device ports per host/controller port).

In certain embodiments, the dynamic allocation of storage address space may be based on JBOD (Just a Bunch of Disks) expansion methods used for port multiplier devices, which specifies that direct access to storage address space of a top level upstream device is granted to the port multiplier. When a port multiplier is directly connected to a top level or root upstream device, reporting is done to the top level upstream device, wherein the top level upstream device is a host device that allocates address space according to a SATA standard.

In certain embodiments, determining and reporting the identity of the port multiplier is performed in response to detecting a change in a downstream port connection. The detected change may be a disconnecting of a storage device or addition of a storage device. In certain embodiments, detecting the change in the downstream port connection includes receiving an indication of an identity of a downstream port multiplier connected to the port multiplier device, wherein the identity of the downstream port multiplier is different than previously received due to a change in a downstream port connection.

In certain embodiments, in response to detection of a new port connection made to a downstream port, the port multiplier may maintain address space assignments unchanged for existing downstream port connections, and assign new address space to the new downstream port connection.

In one embodiment, a port multiplier includes an upstream port to connect to a host device, and multiple downstream ports to connect to a number of downstream devices. The port multiplier is to report via the upstream port an identity of the port multiplier to the host device, wherein the identity is dynamic and based on a number of port connections supported by the port multiplier. The port multiplier further includes a port configuration module to determine the number of port connections supported by the port multiplier based on device counts of each downstream device connected to the downstream ports, and allocate storage address space to each downstream device connected to the downstream ports based on the device count of each downstream device.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, a port expansion is provided by port multipliers that dynamically determine and report their identity based on a number of supported downstream port connections. It will be understood herein that "downstream" refers to devices that are downstream from a host device, which is a top-level or root device that allocates storage space and manages the storage. "Upstream" will be understood to refer to the opposite direction of the data path (toward the host device). Dynamic devices as described herein can be connected to each other to provide multiple levels of port multiplication, up to a specified total number of connections. According to a SATA standard, in one embodiment, the total number of connections supported in any configuration of port multipliers is 15.

Dynamic port multipliers determine and report their identity to an upstream device. For a port multiplier connected directly to the host device, the host device is the upstream device. For a port multiplier connected directly to another port multiplier, the upstream device is the upstream port multiplier. Each device, no matter at what level of the data path they are located, determines its identity based on determining how many port connections exist downstream from its ports, and then reports the identity upstream. The upstream port multiplier then uses that information to determine its identity, and so on, until the top-most port multiplier reports directly to the host device. Because the port multiplier dynamically determines and reports its identity, the number of supported downstream port connections can dynamically change.

For allocation of storage space, the top-most port multiplier receives a storage space allocation based on its reported identity, and then propagates the address allocations downstream based on the reports of how many port connections are downstream from each of its ports. Each port multiplier declares upstream how many device ports need to be supported by the host controller, which includes the downstream port connections of devices connected to its downstream ports. Any downstream port multiplier likewise allocates storage space among its downstream port connections.

Figure 1:
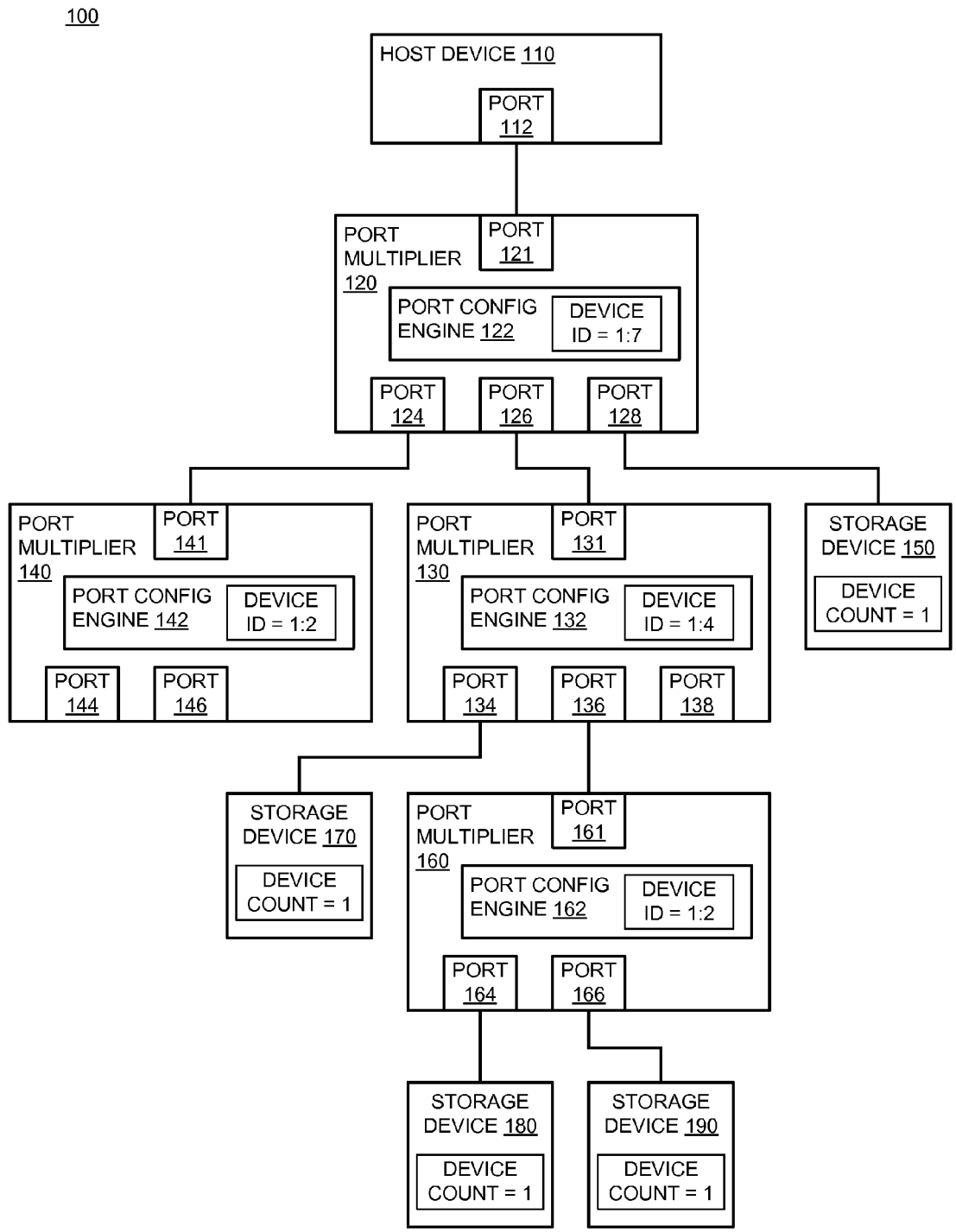
FIG. 1 is a block diagram of an embodiment of a system with different levels of port multipliers connected to a host device.

FIG. 1 is a block diagram of an embodiment of a system with different levels of port multipliers connected to a host device. System 100 represents a storage subsystem with port expansion based on dynamic port multipliers. System 100 includes a computing device (e.g., SATA controller) that allocates and manages storage address ports within the system. The computing system may be a server or a personal computer. Host device 110 may be or be part of the computing system. Host device 110 may be or include a SATA disk controller that interfaces a computing system and its operating system and other components to hardware or physical storage.

Host device 110 includes port 112. Port 112 is a downstream port of host device 110, seeing that host device 110 is a top-level device in the data path of information access (read and/or write) to the storage devices in system 100. It will be understood that host device 112 could include additional ports (not shown).

Briefly referring to the architecture of system 100, it will be understood that the particular configuration is not necessarily a practical configuration. Certain aspects of the configuration (for example, having a port multiplier connected that has no associated storage devices) may in fact be considered to be improper system design. The point of the configuration is not to discuss proper system design, but is shown for purposes of description of the operation of embodiments of the invention. Thus, the configuration of system 100 can be considered purely academic from the perspective of how a theoretical system may function. Additionally, or alternatively, system 100 may represent a snapshot in time of a practical system that has certain dynamic aspects to it, such as temporary removal of a storage device, or addition of a port multiplier for purposes of later including more storage devices, or some other description.

With reference to briefly describing the architecture, port multiplier 120 is connected (directly connected, because it is not connected through another port multiplier) to host device 110. Thus, port multiplier 120 is a top-most port multiplier (or root port multiplier) in system 100. Port multiplier 120 is connected upstream to host device 110.

Port multiplier 120 in turn has three downstream ports, 124, 126, and 128, connected respectively to port multiplier 140, port multiplier 130, and storage device 150. Port multiplier 140 is not shown as having any associated downstream devices. Port multiplier 130 includes three downstream ports, 134, 136, and 138, two of which (134 and 136) are connected to downstream devices. More particularly, port 134 is connected to storage device 170, and port 136 is connected to port multiplier 160. Port multiplier 160 in turn is connected downstream to storage devices 180 and 190.

In more detail, port multiplier 120 includes upstream port 121 connected upstream to downstream port 112 of host device 110. The downstream port 122 is connected to upstream port 141 of port multiplier 140, downstream port 124 is connected to upstream port 131 of port multiplier 130, and downstream port 128 is connected to storage device 150. Port configuration engine 122 represents one or more components that manage the configuration of port multiplier 120. Managing the configuration of a port multiplier refers to performing operations related to determining the identity of the port multiplier (its downstream port connection configuration), reporting the determined identity, allocating storage space, and performing operations related to configuration and management of downstream devices such as exchanging data for disk I/O (input/output).

Port configuration engine 122 determines a device ID associated with port multiplier 120. The device ID is the port multiplier identity reported upstream. The device ID is dynamic based on what is connected downstream (if anything). To determine the device ID, in one embodiment, port configuration engine 122 sends a request to all downstream ports for the identity of devices connected to its ports. Port multiplier 140 (from port 124) would report an ID of '1:2' (a 1 to 2 device), while storage device 150 (from port 128) would report an ID or device count of '1', and port multiplier 130 (from port 126) would report an ID of '1:5'. The device ID of port multiplier 120 can be determined by summing the ID's of all devices connected downstream. Thus, port multiplier 120 has a device ID of 2+1+5=8, which will be reported upstream.

In one embodiment, it could be said that port multiplier 120 "supports" eight downstream port connections. The maximum number of connections potentially supported by any given port multiplier is the maximum number identified by the governing port expansion standard. As used herein, a port multiplier supports the device connections for which port connections exist.

It will be understood that in practice, the exchange with port multiplier 120 may be different for storage device 150 than for port multiplier 130. For example, the actual format of message exchange may be different, and the storage device may report how many drives it contains while the port multiplier indicates its 1-to-N identity. However, the end result is that port multiplier 120 determines based on querying downstream that port multiplier 120 should report an identity of 8 (a 1 to 8 multiplier) for proper storage space allocation.

In the discussion above regarding port multiplier 120, it was assumed that port multiplier 130 knew its identity and could respond properly. However, in one embodiment the query triggers the port multiplier to determine its identity. Thus, in response to the query by port multiplier 120, port multiplier 130 may in turn query its ports to determine its identity. The cascade of querying may continue down to the lowest level of port multiplier (port multiplier 160 of system 100) to dynamically discover the structure of the entire storage subsystem. In an alternate embodiment, a query may not trigger a port multiplier to discover its identity. In such an implementation, port multipliers may discover their identities periodically, or only in response to detecting a downstream change (e.g., the removal or connection of a device downstream). In one embodiment, downstream devices may push identity upstream, rather than waiting for a request or query. Thus, different approaches may be used by the port multipliers to discover their device ID.

A similar technique may be used by all port multipliers to determine their identities. Port multiplier 140 determines through port configuration engine 142, either in response to a query by port multiplier 120, in response to a trigger identifying a change to a downstream connection, or on a schedule, that its device ID is '1:2'. Port multiplier 130 determines via port configuration engine 132 that its device ID is '1:5'. Storage device 170 would report an identity of '1' to port multiplier 130.

Port multiplier 160 is connected to downstream port 136 of port multiplier 130 via upstream port 161. Port multiplier 160 determines via port configuration engine 162 that it has a device ID of '1:2'. Port 164 is connected to storage device 180, which has a device count of 1, and port 166 is connected to storage device 190, also with a device count of 1. Thus, device counts totaling '2' are connected to downstream ports of port multiplier 160. Port multiplier 160 is only connected downstream to the storage devices and not another port multiplier, giving port multiplier 160 an ID of '1:2'. Port multiplier 160 reports its identity upstream to port multiplier 130.

Another way to understand system 100 is through a description of the system at various snapshots, assuming that the system and its connections are built out in stages. Consider first that port multiplier 120 is connected to host device 110, and no downstream connections are made to port multiplier 120. Port multiplier 120 would report an identity of 1:3 to host device 110. The storage address allocation may be address '0' for port 124, '1' for port 126, and '2' for port 128.

Assuming that port multiplier 140 is next connected to port multiplier 120, but additional connections are not made, port 124 of port multiplier 120 no longer is a single port in system 100. Rather, it is connected to port multiplier 140, which has an ID of 1:2 (since is has exposed ports 144 and 146). Port multiplier 120 would then have a device ID of 1:4. Additionally, storage address allocation may be changed, for example, by allocating address '0' to port 144 of port multiplier 140, maintaining addresses '1' and '2' for ports 126 and 128 respectively, and allocating address '3' to port 146. Other allocations are possible, including reassigning all addresses.

Similar changes would occur if port multiplier 130 were next connected. Port multiplier 120 would report a device ID of 1:6, address '1' of port 126 would be reassigned to a new port, and new addresses would be assigned to the newly available ports (thus, two more addresses would be allocated).

While described above with specific reference to the example of system 100, it will be understood that the techniques described herein are not limited to the example of FIG. 1. In general, a dynamic port multiplier is described. The dynamic port multiplier dynamically determines its identity based on downstream port connections. In one embodiment, SATA port expansion is provided as governed by standards, such as those available at www_sata-io_org, where the periods have been replaced by underscores to avoid unintentional hyperlinking.

As discussed above, the identity of a port multiplier is dynamically determined. As suggested above, in one embodiment, a port multiplier determines its identity in response to a request by its host device. To be clear in description, the top-level host device in a system is the controller of the computing system or the computing system itself to which the storage subsystem is connected. However, in one embodiment each port multiplier down the subsystem considers the upstream device to which it is connected to be its "host device". Thus, a request from upstream could be understood as a request from its host device. In general, a port multiplier could be considered a host device for every device directly connected to its downstream device ports.

In one embodiment, a port multiplier determines its identity in response to a device being connected to or disconnected from the system. In response to a change to a port connection, a signal is sent upstream to the device hosting the newly connected or disconnected device. A change to a port connection can result in a change to memory allocation from the host of the connected/disconnected device (and other hosts up to the top-level of the subsystem). In one embodiment, the memory allocation of only newly connected or disconnected devices is changed, and memory space allocation remains unchanged for devices whose connections remain unchanged.

In response to a change in a downstream connection, a port multiplier may determine its identity (which would be changed), and report upstream an identity representing all exposed device ports. The change may continue to propagate upstream. In one embodiment, connection of an additional storage device may be disallowed due to the maximum device count being exceeded, in which case the new device may not be allocated any storage space. Thus, while the new device may be physically connected, it will not be connected to the system for purposes of providing storage. Otherwise, storage space may be adjusted appropriately to the change (either removal or addition of a device port).

Figure 2:
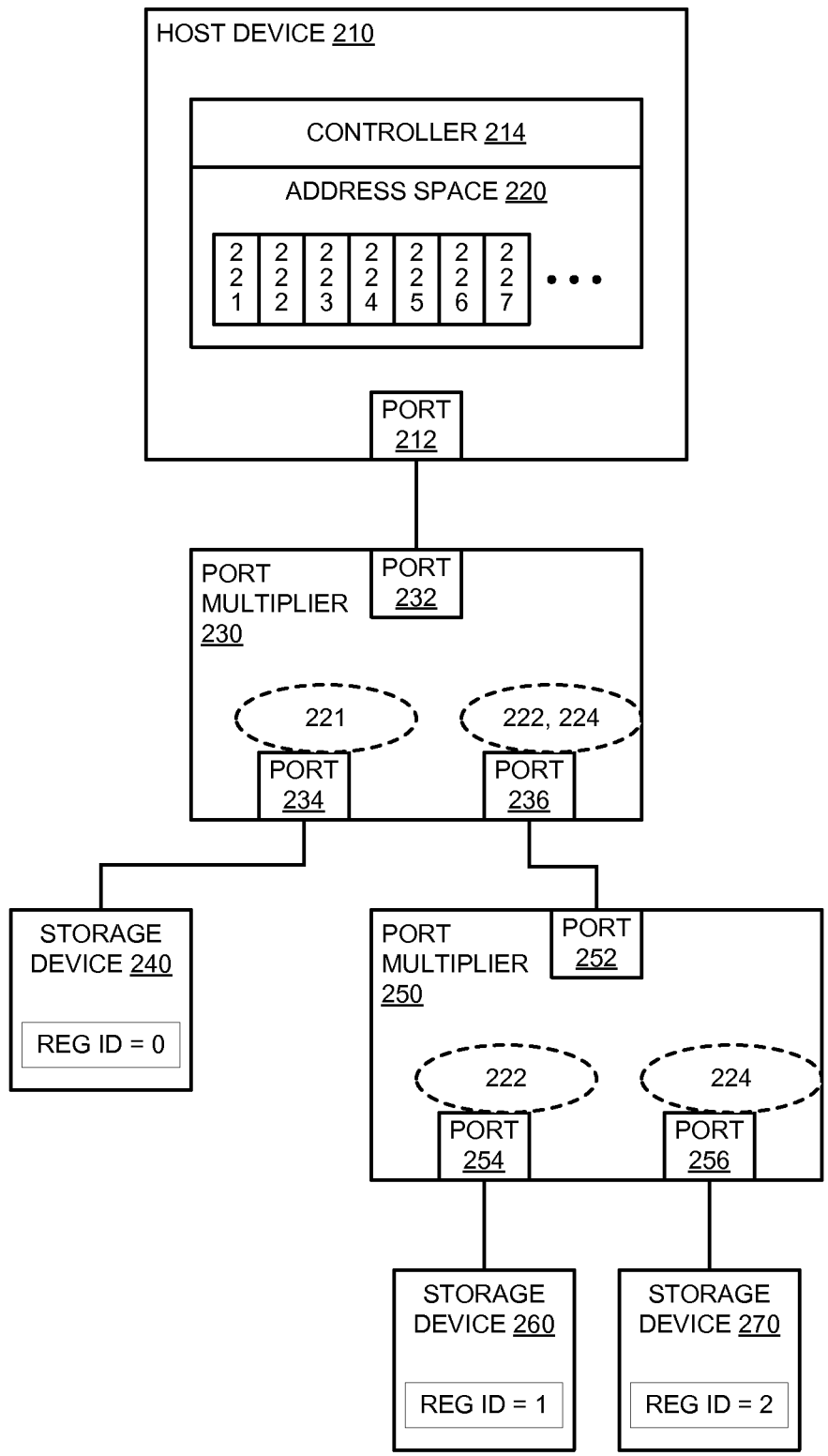
FIG. 2 is a block diagram of an embodiment of a system showing address allocation for different levels of port multipliers connected to a host device.

FIG. 2 is a block diagram of an embodiment of a system showing address allocation for different levels of port multipliers connected to a host device. In one embodiment, system 200 is an example of a system according to system 100 of FIG. 1. Thus, the dynamic determination of device ID can be performed as described above. Additionally represented in system 200 is a registration ID for each storage device, and the allocation of storage space.

In one embodiment, as the identity of a port multiplier changes, the amount of storage space allocated to the port multiplier is modified correspondingly. System 200 shows a static view of what system 200 may look like at a particular point in time. An explanation is also provided below of how a change to the system configuration would affect the representation shown.

Host device 210 represents one or more components of a computing system to which the storage subsystem of system 200 is connected. Host device 210 is shown to include controller 214, which is a disk controller that manages the storage in the system. In one embodiment, controller 214 may be host device 210. Address space 220 represents address space that can be allocated to the storage of the various storage devices of system 200. For purposes of simplicity in description, each illustrated address space (221-227) is a space for a single drive. It will be understood that in practice, different sizes of address space may be allocated to different storage devices. There is no requirement for each storage device to be the same size or to occupy the same amount of allocated storage. The allocation of storage may be handled in any manner convenient for the architecture of the particular system in which it is implemented.

Host device 210 includes downstream port 212, which is connected to upstream port 232 of port multiplier 230. Port multiplier 230 is a dynamic port multiplier according to any embodiment described herein. Based on the discussion above, it will be understood that the device ID of port multiplier 230 would be '3'. According to the simplified example explained above, port multiplier 230 is allocated three of address spaces 220 (specifically, 221, 222, and 224) based on its port connection count. Port multiplier 220 can then allocate the storage among its downstream ports based on what is connected to each port.

As illustrated, port multiplier 230 allocates address space 221 to storage device 240. Address spaces 222 and 224 are allocated to port multiplier 250. In one embodiment, communication and data requests between device (e.g., port multipliers 230 and 250) can be performed with address space references that are relative to a specific offset, as opposed to being the specific address spaces allocated by host device 210. Thus, in one embodiment, the allocated storage address space may be used to map from storage address references used between devices with address space 220 of host device 210.

Port multiplier 250 allocates its assigned storage space among storage devices 260 and 270. As illustrated in system 200, there is no requirement that address space must be assigned contiguously for a particular device.

In one embodiment, each storage device is registered within the system and given an ID (shown as reg ID). Storage device 240 is registered as storage device 0 in the system, while storage devices 260 and 270 are, respectively, devices 1 and 2. Just as there is no requirement that address space be allocated contiguously, there is no specific requirement that address space be allocated in order based on storage device ID. In one embodiment, storage device ID is assigned in order from higher-level port multipliers to lower-level port multipliers, and from lower-ID ports to higher-ID ports. However, such assignments are not requirements. In accordance with such an assignment scheme, storage device 240 receives registration ID '0' for being connected to port multiplier 230. Storage device 260 and storage device 270 are both connected to port multiplier 250, and so are assigned registration IDs based on the port to which they are connected. Assuming that port 254 has a lower ID than port 256, storage device 260 is assigned registration ID '1', and storage device 270 is assigned registration ID '2'.

In the case of dynamic change within system 200, each port multiplier affected by the change would determine its identity, and address space allocation may be updated. For example, assume that port multiplier 250 is a 1 to 3 multiplier with another port (not shown). If an additional storage device (not shown) is connected to the additional port, port multiplier 250 would update its identity to '3' instead of '2', which it would then report to port multiplier 230. Port multiplier 230 would update its identity to '4', and host device 210 could allocate additional storage space (e.g., one of 223, 225, 226, . . . ), which port multiplier 230 would allocate to port 236. In one embodiment, multiple memory space allocations could be changed responsive to the addition of the other device.

Thus, a dynamically changing port multiplier device identifier can be used to determine how much memory space is allocated to the port multiplier. In this way, the amount of storage space allocated to the port multiplier is changeable based on the number of connections supported by the port multiplier.

In the reverse example, consider that port multiplier 250 (a 1 to 2 port multiplier) replaces a 1 to 2 port multiplier (resulting in removing an exposed device port in the system). In one embodiment, memory space allocation within system 200 is not changed except for the changed port connection. Thus, allocation of a memory space for the removed port may simply be removed, while allocation of other spaces may remain unaffected. Alternatively, removal of a device port may cause a re-allocation of storage space within system 200, and the storage devices may be assigned a different memory space.

The allocation of memory locations may be affected by the method used in the system to assign storage space. For example, in one embodiment, storage address space is allocated in accordance with JBOD (Just a Bunch of Disks). With JBOD, direct access to storage address space of the top level device (host device 210) is granted to each port multiplier based on allocation of address space. Thus, a port multiplier may be given direct access to the allocated memory space, using the Just a Bunch of Disks (JBOD) communication exchanges.

Figure 3:
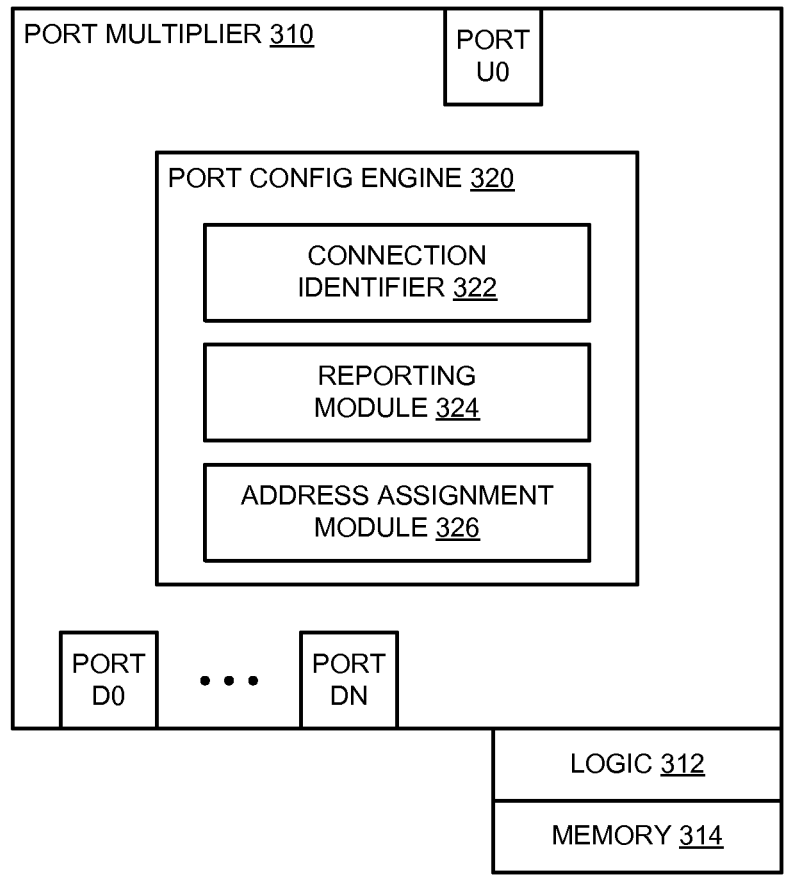
FIG. 3 is a block diagram of an embodiment of a port multiplier with a port configuration engine.

FIG. 3 is a block diagram of an embodiment of a port multiplier with a port configuration engine. Port multiplier 310 is an example of a port multiplier according to any embodiment described herein. Port multiplier 310 includes port U0, which is a port by which the port multiplier connects with a host device. Herein such a port is referred to as an upstream port. The host device can be a port multiplier that is at a higher level of a storage subsystem, or it may be the host controller device itself. Ports D0 through DN represent ports through which port multiplier 310 is connected to other port multipliers at a lower level of the storage subsystem and/or to storage devices. Herein such ports are referred to as downstream ports.

Port multiplier 310 includes hardware components such as the physical ports to connect to other devices. Additionally, logic 312 represents hardware logic that enables port multiplier 310 to perform operations (such as determining its identity). The operations may include sending and receiving requests, performing computations, or performing other functions related to its execution. Memory 314 represents hardware storage for code and variables, and may include temporary storage (such as random access memory (RAM)), registers, or non-volatile storage (e.g., flash, NVRAM, OTP, or read-only memory (ROM)). Port multiplier 310 may also include software components related to its operation. The software components may be implemented as firmware that directs operation of the device.

Port multiplier 310 includes port configuration engine 320, which represents one or more components to perform operations related to the configuration of the port multiplier and the storage subsystem. More particularly, port configuration engine 320 includes connection identifier 322, reporting module 324, and address assignment module 326.

Connection identifier 322 represents mechanisms that enable port multiplier 310 to determine whether a device is connected to a port D0 through DN. Various circuits are known to detect a connection to a port, and will not be discussed in detail. Additionally, port connections can be determined by polling a port, or using a communication line interrupt, or other mechanism. In one embodiment, devices are configured to communicate with port multiplier 310 in connection with connecting to and/or disconnecting from the port multiplier. Thus, connections may be detected by communication from the connecting or disconnecting device. Additionally or alternatively, connection identifier 322 (or another component of port multiplier 310) may query the connected devices to determine what device count to attribute to each connection.

Reporting module 324 enables port multiplier 310 to communicate upstream to a host device what its determined identity is. The reporting may be performed based on a communication protocol defining how and when port multiplier 310 is to communicate. Thus, in one embodiment, reporting unit 324 may include or may access a protocol stack used to communicate upstream.

Address assignment module 326 enables port multiplier 310 to allocate storage space to its port connections. In one embodiment, port configuration engine 320 sees each downlink port connection as having a particular device count value or a storage amount value, and assigns address space based on the value. In this way, port configuration engine 320 would not need to know anything about the architecture of what is connected to the downstream port, but only how much storage space to assign to it. All storage access requests to the port can be managed at port multiplier 310 based on the assignments to the port.

Figure 4:
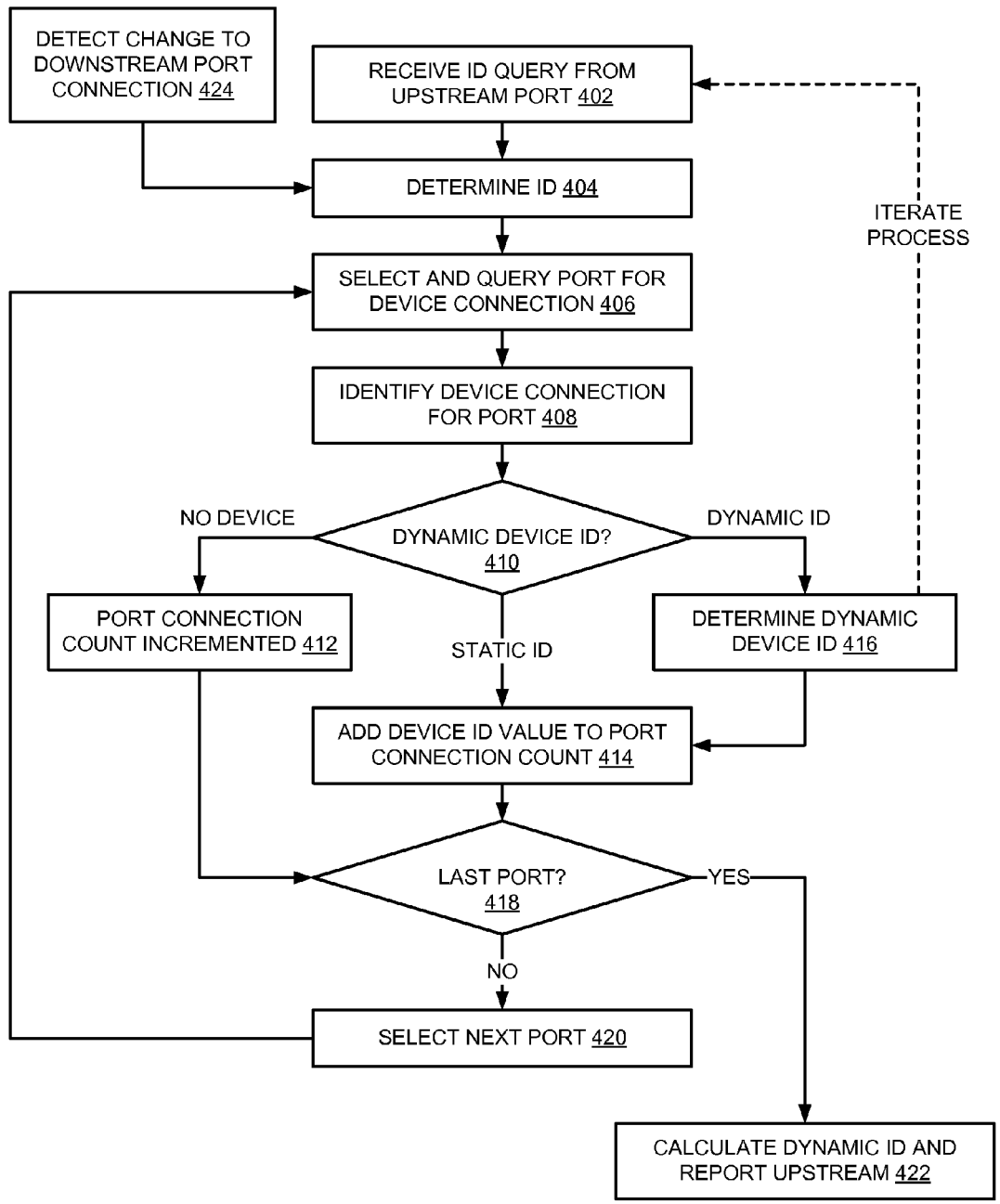
FIG. 4 represents a flow diagram of an embodiment of determining a dynamic port multiplier identity.

FIG. 4 represents a flow diagram of an embodiment of determining a dynamic port multiplier identity. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments of the invention; thus, not all actions are required in every implementation. Other process flows are possible.

In one embodiment, a dynamic port multiplier receives a query from upstream requesting its ID, 402. In alternate embodiments, a port multiplier may determine its identity not in response to a query, and may report its ID without having received a query requesting it. The port multiplier determines its ID, 404. The ID is determined at least in part based on what devices are connected downstream from the port multiplier. Thus, a port multiplier needs to determine what is connected to each port to determine its ID to determine if any of its port is expanded downstream.

In one embodiment, the port multiplier selects a port and queries the port for a device connection, 406. Alternative methods could be used, for example, in a system where a mechanism is used to identify when a port has a device connected to it, the port multiplier may only query ports with connected devices, instead of checking all ports for connections. It will also be understood that querying and determining a connection ID for a particular port may be performed separately from querying for another port, instead of performing the querying for all ports in sequence.

For each port, the port multiplier can identify a device connection for the port, 408. In one embodiment, the port multiplier determines if the identity of a particular port is a dynamic device ID, 410. In one embodiment, a dynamic device ID could be identified by a specific identifier or bit or group of bits. If there is no device connected, the port contributes only itself to the port connection count of the port multiplier, 412.

If the port is connected to a device, but the device does not have a dynamic ID, the device may be considered to have a static ID, and the reported device ID value is added to the port connection count of the port multiplier, 414. If a value is static, no more levels of expansion are possible beyond the static value. If the port has a connected device that has a dynamic ID, the device may determine its dynamic device ID to report to the port multiplier, 416. It will be understood that a device with a dynamic ID is another port multiplier, which may then iterate the process through its downstream ports to determine its identity, beginning with 402. Once the ID is known, it will be reported, and the dynamic device ID is added to the port connection count, 414. If the port queried is the last port, 418, the port multiplier calculates its dynamic ID and reports its ID upstream in response to the query (or as part of some other reporting process), 422.

If the port is not the last port, 418, the port multiplier selects the next port, up to a maximum number for each root port (e.g., querying through the ports in sequence from lowest ID to highest, or some other selection mechanism), 420. For the next port, the port multiplier then repeats with querying the selected port for device connection, 406, until no more ports are left to query.

In one embodiment, device ID querying and port connection can be used in the same system. Thus, in one embodiment, the port multiplier detects a change in a downstream port connection, 424, and determines its ID in response to the detecting the change, 404. In such an implementation, the port selected for query (406-418) could be only the port on which the change was detected, or all ports could be queried. In an implementation where only the port on which the change was detected is queried, it could be the only port queried, and thus the last port, 418, according to the flow diagram.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   identifying one or more devices connected to downstream ports of a Serial Advanced Technology Attachment (SATA) port multiplier device, the one or more devices including other SATA port multiplier devices;
   detecting change in downstream port connections at the SATA port multiplier device;
   updating an identity of the SATA port multiplier device based on the change in downstream port connections of the SATA port multiplier, the identity indicative of a number of available downstream port connections of the SATA port multiplier device for connecting the one or more devices;
   sending the updated identity of the SATA port multiplier device to a device connected to an upstream port of the SATA port multiplier device; and
   receiving allocation of storage address space to the SATA port multiplier device based on the updated identity, the storage address space allocation for existing downstream port connections remaining unchanged, and newly added downstream port connection allocated with new address space.

2. The method of claim 1, wherein the allocation of storage address space is based on a JBOD (Just a Bunch of Disks) expansion method, direct access to storage address space of a top level upstream device is granted to the SATA port multiplier device.

3. The method of claim 1, wherein the updated identity is sent to a top level upstream device that allocates address space according to a SATA standard.

4. The method of claim 1, wherein detecting the change in the downstream port connections is performed by at least detecting one of a disconnection of a storage device or connection of a storage device.

5. The method of claim 1, wherein detecting the change in the downstream port connections is performed by at least receiving an identity of a downstream port multiplier connected to the SATA port multiplier device.

6. A non-transitory computer readable storage medium having instructions stored thereon, which when executed, cause a device to:
   identify one or more devices connected to downstream ports of a Serial Advanced Technology Attachment (SATA) port multiplier device, the one or more devices including other SATA port multiplier devices;
   detect change in downstream port connections at the SATA port multiplier device;
   update an identity of the SATA port multiplier device based on the change in the downstream port connections of the SATA port multiplier, the identity indicative of a number of available downstream port connections of the SATA port multiplier device for connecting the one or more devices;
   send the updated identity of the SATA port multiplier device to a device connected to an upstream port of the SATA port multiplier device; and
   receive allocation of storage address space to the SATA port multiplier device based on the updated identity, the storage address space allocation for existing downstream port connections remaining unchanged, and newly added downstream port connection allocated with new address space.

7. The non-transitory computer readable storage medium of claim 6, wherein the allocation of storage address space is based on a JBOD (Just a Bunch of Disks) expansion method, direct access to storage address space of a top level upstream device is granted to the SATA port multiplier device.

8. The non-transitory computer readable storage medium of claim 6, the updated identity is sent to a top level upstream device that allocates address space according to a SATA standard.

9. The non-transitory computer readable storage medium of claim 6, wherein detecting the change in the downstream port connections is performed by at least detecting one of a disconnection of a storage device or connection of a storage device.

10. The non-transitory computer readable storage medium of claim 6, wherein the change in the downstream port connections is detected by receiving an identity of a downstream port multiplier connected to the SATA port multiplier device.

11. A port multiplier device comprising:
    a plurality of downstream ports configured to enable connection to a number of downstream devices including other SATA port multiplier devices;
    a port configuration module configured to detect change in the plurality of downstream port connections, and update an identity of the port multiplier device based on the change in the downstream port connections, the identity indicative of a number of available downstream port connections of the plurality of downstream ports for connecting the downstream devices, and allocate storage address space to each of the downstream ports based on the device count of downstream devices connected to each of the downstream ports, the storage address space allocation for existing downstream port connections remaining unchanged, and newly added downstream port connection allocated with new address space; and
    an upstream port connected to a host device, the upstream port configured to report the updated identity of the port multiplier to the host device to cause the host device to allocate storage address space to the port multiplier device based on the updated identity.

12. The port multiplier device of claim 11, wherein the port multiplier device is configured to report via the upstream port to a top level upstream device that allocates address space according to a SATA standard.

13. The port multiplier device of claim 11, wherein the port configuration module is configured to detect disconnection of a storage device or connection of a storage device.

14. The port multiplier of claim 11, wherein the port configuration module is further to receive an identity of a downstream port multiplier connected to the port multiplier device.

* * * * *